US009821847B2

(12) United States Patent
Robinson et al.

(10) Patent No.: US 9,821,847 B2
(45) Date of Patent: Nov. 21, 2017

(54) METHOD FOR GUIDING AN OFF-ROAD VEHICLE ALONG A CURVED PATH

(71) Applicant: Deere & Company, Moline, IL (US)

(72) Inventors: William D. Robinson, Ames, IA (US); Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 14 days.

(21) Appl. No.: 14/950,590

(22) Filed: Nov. 24, 2015

(65) Prior Publication Data

US 2017/0144704 A1  May 25, 2017

(51) Int. Cl.
*B62D 15/02* (2006.01)
*G05D 1/02* (2006.01)
*B60Q 9/00* (2006.01)

(52) U.S. Cl.
CPC ............ *B62D 15/025* (2013.01); *B60Q 9/00* (2013.01); *G05D 1/0212* (2013.01)

(58) Field of Classification Search
CPC ....... B62D 15/025; B60Q 9/00; G05D 1/0212
See application file for complete search history.

(56) References Cited

U.S. PATENT DOCUMENTS

| | | | |
|---|---|---|---|
| 5,029,088 A | | 7/1991 | Minami |
| 5,986,575 A | * | 11/1999 | Jones ..................... G08G 1/087 |
| | | | 340/906 |
| 6,009,189 A | * | 12/1999 | Schaack ............ A61B 1/00147 |
| | | | 348/137 |
| 2004/0134686 A1 | * | 7/2004 | Burrows ................. E21B 7/046 |
| | | | 175/45 |
| 2004/0193348 A1 | * | 9/2004 | Gray ..................... A01B 69/008 |
| | | | 701/50 |
| 2005/0225477 A1 | * | 10/2005 | Cong .................. B60K 31/0008 |
| | | | 342/70 |
| 2007/0285041 A1 | * | 12/2007 | Jones ................... G05D 1/0219 |
| | | | 318/568.12 |
| 2009/0093924 A1 | * | 4/2009 | Aso .......................... B62D 1/28 |
| | | | 701/31.4 |
| 2009/0099730 A1 | | 4/2009 | McClure |

(Continued)

FOREIGN PATENT DOCUMENTS

| | | | | |
|---|---|---|---|---|
| DE | EP 0055304 A1 | * | 7/1982 | ........... G05D 1/0223 |
| JP | EP 0861743 A2 | * | 9/1998 | ........... B60C 23/061 |

OTHER PUBLICATIONS

Search Report issued in counterpart application No. GB1618281.8, dated Apr. 26, 2017 (3 pages).

*Primary Examiner* — Tuan C. To

(57) ABSTRACT

As an off-road vehicle traverses a curved path driven by an operator, a data processor determines an error estimate between the points on the curved path and a generally circular perimeter about an estimated center point consistent with alignment of the curved path to the generally circular perimeter in accordance with a least squares algorithm or a modified least squares algorithm. The data processor or user interface provides an indicator to an operator of the vehicle that an arc length or angular displacement of the curved path with respect to the estimated center point is sufficient to estimate accurately the estimated center point and the radius of the generally circular perimeter if the determined error estimate is less than a threshold error.

13 Claims, 8 Drawing Sheets

(56) References Cited

U.S. PATENT DOCUMENTS

| | | | |
|---|---|---|---|
| 2011/0071801 A1* | 3/2011 | Carrasco | G06F 17/5004 703/1 |
| 2012/0271522 A1* | 10/2012 | Rupp | B62D 15/027 701/70 |
| 2013/0211658 A1* | 8/2013 | Bonefas | B65G 67/24 701/28 |
| 2014/0249691 A1* | 9/2014 | Hafner | B62D 13/06 701/1 |
| 2015/0251662 A1* | 9/2015 | Nakayama | B60W 30/18145 701/400 |
| 2015/0251697 A1* | 9/2015 | Lavoie | B62D 13/06 701/523 |
| 2015/0294161 A1* | 10/2015 | Schamp | B60K 31/00 701/37 |
| 2016/0023526 A1* | 1/2016 | Lavoie | B60D 1/305 701/41 |
| 2016/0031482 A1* | 2/2016 | Lavoie | B62D 15/0285 701/41 |
| 2016/0257341 A1* | 9/2016 | Lavoie | B62D 13/06 |
| 2017/0008560 A1* | 1/2017 | Kyrtsos | B62D 13/06 |
| 2017/0039853 A1* | 2/2017 | Chambers | G01C 21/3492 |
| 2017/0071122 A1 | 3/2017 | Schmidt | |

\* cited by examiner

METHOD FOR GUIDING AN OFF-ROAD VEHICLE ALONG A CURVED PATH

FIELD

This disclosure relates to a method for guiding an off-road vehicle along a curved path.

BACKGROUND

A field may be arranged with a generally circular perimeter or circular region where plants or crops are cultivated. For example, a field with a generally circular perimeter or circular region may be irrigated by a pivot irrigation system. An operator of an off-road vehicle may manually steer the vehicle to track the circular perimeter, or an arc of the circular perimeter to load a field boundary into a guidance computer for the off-road vehicle. In practice, the operator may use visual cues or one or more reference markings in an attempt to track the circular perimeter. Although the operator of the off-road vehicle could manually drive the entire circular perimeter to load a field boundary into the guidance computer, such task can be tedious, time-consuming, and prone to error. Accordingly, there is a need for a method for guiding an off-road vehicle along a curved path, such as indicating to the operator when the arc driven by the operator is sufficient to accurately and reliably estimate the remainder of the circular perimeter and/or its center point.

SUMMARY

In accordance with one embodiment, a method for guiding an off-road vehicle comprises collecting and storing location data, such as measured of points (e.g., location points), by a location-determining receiver (e.g., satellite navigation receiver), along a curved path over a time period as an operator of the vehicle manually steers the vehicle along the curved path associated with a generally circular perimeter of a field. In real-time as the vehicle traverses the curved path, a data processor determines an error estimate between the measured points (e.g., location points) on the curved path and the generally circular perimeter about an estimated center point consistent with alignment of the curved path to the generally circular perimeter in accordance with a least squares algorithm or a modified least squares algorithm. In real-time as the vehicle traverses the curved path, the data processor or user interface provides an indicator to an operator of the vehicle that an arc length or angular displacement of the curved path with respect to the estimated center point is sufficient to estimate accurately the estimated center point and the estimated radius of the generally circular perimeter if the determined error estimate is less than a threshold error. In certain embodiments, the operator can cease or discontinue manually steering the vehicle along the curved path if the determined error estimate is less than the threshold error.

DETAILED DESCRIPTION

Figure 1:
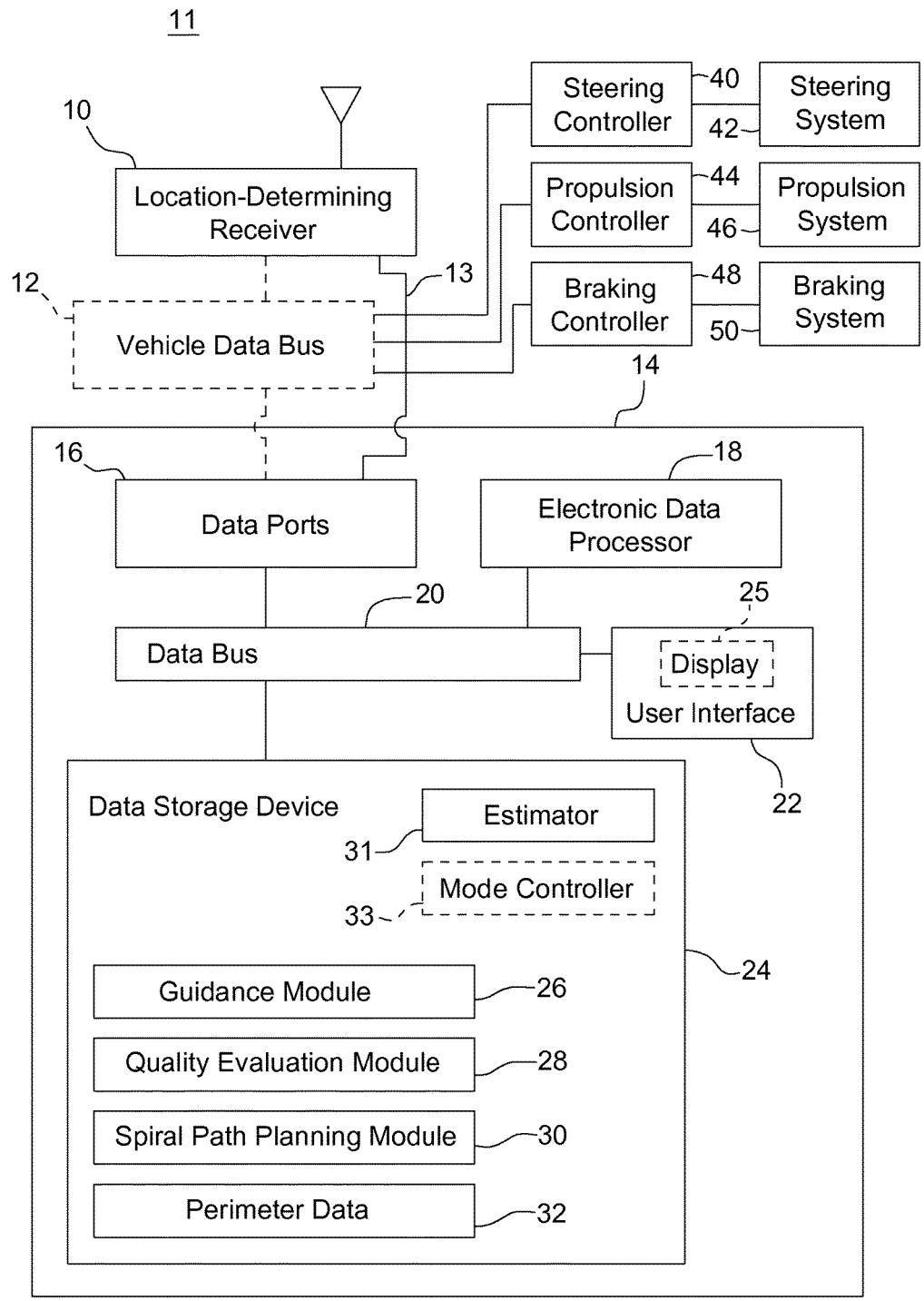
FIG. 1 is a block diagram of one embodiment for a system for guiding an off-road vehicle along a curved path.

In accordance with FIG. 1, one embodiment of a system 11 for guidance of an off-road vehicle comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12.

In one embodiment, the electronic data processing system 14 comprises an electronic data processor 18, one or more data ports 16, a user interface 22 and data storage device 24 coupled to a data bus 20. The data storage device 24 may store, retrieve, read and write one or more of the following items: a guidance module 26, a quality estimation module 28, a spiral path planning module 30, a perimeter data 32, estimator 32, and mode controller 33. A module means software, electronics, or both.

The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device.

The data port 16 may comprise a data transceiver 40, buffer memory 42, or both. The user interface 22 may comprise one or more of the following: a display (e.g., display 25), a touch screen display, a keypad, a keyboard, a control panel, a pointing device (e.g., electronic mouse), or another device for entry or output of data from the data processing system 14.

The data storage device 24 may comprise one or more of the following: electronic memory, nonvolatile electronic memory, an optical data storage device, a magnetic data storage device, or other device for storing digital or analog data.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver 10 or its memory or data storage to perform certain functions, or (3) electronic, electrical circuits or modules that can perform substantially equivalent functions to the software, embedded firmware or program instructions.

In one embodiment, the estimator 31 is adapted to determine one or more of the following estimates that are consistent with a manual path of the vehicle driven or steered by the operator: estimated radius, estimated center point, and estimated perimeter data. Further, the estimator 31 may base the above estimates on one or more of the following measurements: observed radius, observed center point, or observed perimeter data consistent with a curved path the vehicle along a generally circular perimeter of the field, where at least part of the curved path or the generally circular perimeter is manually driven by the operator.

In one embodiment, the mode controller 33 comprises logic for deciding whether or not to use a manual guidance mode or an automated guidance mode of the off-road vehicle at any given time or at a current location of the vehicle based on the quality of the estimates of radius, center point, or both provided by the quality evaluation of module 28, among other possible inputs of the guidance module 26 (e.g., obstacle or obstruction avoidance and reliability or availability of location data). The quality evaluation module 28 is adapted to provide standard deviation, variance, least squares error data or derivatives, or other metrics of quality related to the radius, center point, or both, or perimeter data provided by the estimator 31. In one embodiment, mode controller 33 may disable the operator's ability to select an automated guidance mode or activate the guidance module 26 until and if the quality data meets or exceeds a minimum threshold quality level, where the minimum quality level is a factory programmed setting or a user-definable setting within a certain range.

In one embodiment, the spiral path planning module 30 comprises software instructions related to determining or estimating a spiral path plan for a field with a generally circular perimeter. The spiral path planning module 30 determines projected vehicle heading data versus location data (e.g. two or three dimensional coordinates) of a vehicle based on recent perimeter data 32, estimated center point data, estimated radius data, or any combination of the foregoing data stored in, retrieved from or associated with the data storage device 24. As used herein, heading can refer to: (1) an angular direction of travel of the vehicle with reference to due North or magnetic North, or (2) a yaw or yaw angle of the vehicle with reference to coordinate system, such as a Cartesian coordinate system. The spiral path planning module 30 can support the operation of the vehicle in the automated guidance mode in which the guidance module 26 controls the vehicle to track or follow the spiral path plan, a curved path plan, or other path plan of the spiral path planning module 30. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1, the steering controller 40, the propulsion controller 44 and the braking controller 48 are coupled to the vehicle data bus 12. For example, the data processing system 14 can communicate with the steering controller 40, the propulsion controller 44 and the braking controller 48, and vice versa. In one embodiment, the steering controller 40 is coupled to the steering system 42, such as an electrical motor or electrohydraulic device that is mechanically coupled to a steering mechanism (e.g., rack-and-pinion or Ackerman steering system) for controlling the angular orientation of one or more wheels about a generally vertical axis. In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

In one embodiment, the location-determining receiver 10 provides one or more of the following types of data for a vehicle: heading data, velocity data, and location data (e.g., two or three dimensional coordinates). The location-determining receiver 10 may comprise a satellite navigation receiver, a Global Navigation Satellite System (GNSS) receiver, a Global Positioning System (GPS) receiver, or another receiver for determining position data, velocity data, and heading data for the vehicle. For example, the location-determining receiver 10 may comprise a satellite navigation receiver with differential correction for providing precise position data, velocity data and heading data for the vehicle. A separate receiver or transceiver (e.g., satellite, cellular, or wireless device) may receive the correction data or differential correction data via a wireless signal transmitted from a satellite or a terrestrial base station (e.g., real-time kinematic (RTK) base station).

In one embodiment, a location-determining receiver 10 provides location data, path heading data, vehicle heading data, or velocity data along a curved path consistent with the generally circular perimeter to the data processing system 14, or its estimator 31, guidance module 26, or spiral path planning module 30. For instance, the location data and path heading data may comprise historic location data and corresponding historic path headings for the vehicle as it traversed the curved path about the generally circular perimeter (or a portion thereof).

Figure 2:
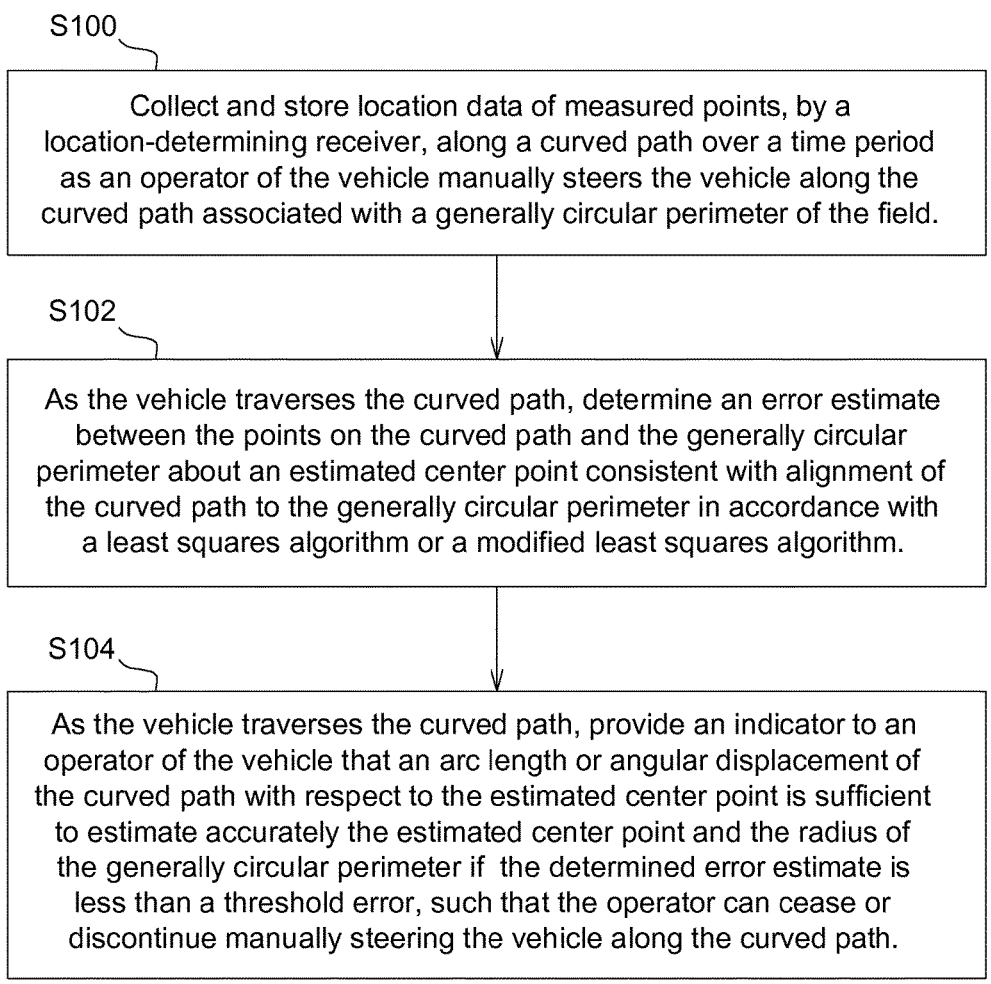
FIG. 2 is a block diagram of one embodiment for a method for guiding an off-road vehicle along a curved path.

FIG. 2 illustrates a method for guiding an off-road vehicle. The method of FIG. 2 begins in step S100.

In step S100, a location-determining receiver 10 (e.g., satellite navigation receiver) collects location data (e.g., two or three dimensional coordinates) of measured points along a curved path over a time period as an operator of the vehicle manually steers the vehicle along the curved path associated with a generally circular perimeter of the field. Meanwhile, in step S100 the data processing system 14 or data processor 18 stores the collected location data in a data storage device 24. For example, the collected location data may be stored in the data storage device 24 as perimeter data 32, or location data (e.g., historic observed location data) may be stored in conjunction with heading data (e.g., historic observed heading data) as the operator of the vehicle manually steers the vehicle along the curved path associated with a generally circular perimeter (or a portion thereof) of the field.

In one example of executing step S100, a location-determining receiver 10 collects location data of measured points along the curved path as an operator manually steers the vehicle over the curved path over the arc length, or its equivalent arc angle (e.g., angular displacement 70 in FIG. 8) that is greater than approximately forty degrees with respect to the estimated center point of the generally circular perimeter of the field. In another example of executing step S100, a location-determining receiver 10 collects location data of measured points along the curved path as an operator manually steers the vehicle over the curved path over the arc length, or its equivalent arc angle (e.g., angular displacement 70 in FIG. 8) that is greater than approximately forty (40) degrees and less than approximately one-hundred (100) degrees with respect to the estimated center point of the generally circular perimeter of the field.

In step S102, in real-time as the vehicle traverses the curved path, a data processor 18, estimator 31 or quality evaluation module 28 determines an error estimate between the location points on the curved path and the generally circular perimeter about an estimated center point consistent with alignment (e.g., fitting) of the curved path to the generally circular perimeter (e.g. reference model) in accordance with a least squares algorithm or a modified least squares algorithm. For example, a least squares algorithm uses regression analysis or minimizes the sum of squared residuals to determine an approximate solution of vehicle way points or location points that are consistent with or lie on a generally circular perimeter about a central point of the field. A residual means the difference between an observed position point value and a fitted position point value (e.g., observed and fitted locations) provided by one or more equations, such as a circle equation or an ellipse equation. A circle with the center point at the origin of the Cartesian coordinate system may be defined in accordance with the following equation: $x^2+y^2=r^2$, x is the value of the circle with respect to the x-axis of the Cartesian coordinate system, and y is the value of the circle with respect to the y-axis of the Cartesian coordinate system. Similarly, if the center point of the circle is offset from the origin, by $x_0$ along the x-axis and $y_0$ along the y-axis, the above circle equation becomes: $(x-x_0)^2+(y-y_0)^2=r^2$. In practice, under the least squares approach or the modified least squares approach, the data processor 18 may iteratively estimate solutions for a modeled circle that fits the observed position points to minimize the sum of squared residuals or to minimize another error estimate to determine an approximate solution.

In step S104, in real-time as the vehicle traverses the curved path, the data processor 18, estimator 31, or quality evaluation module 28 provides an indicator, via a user interface 22 or display 25, to an operator of the vehicle that an arc length in a vehicle drive direction (66 in FIG. 8) or angular displacement (70 in FIG. 8) of the curved path with respect to the estimated enter point 72 is sufficient to estimate accurately the estimated center point and the radius of the generally circular perimeter if the determined error estimate is less than a threshold error.

Step S104 may be executed in accordance with various techniques, which may be applied separately or cumulatively. Under a first technique, an indicator comprises an error estimate, variance, or standard deviation in the center point that is determined in units of distance. Under a second technique, an indicator comprises an error estimate, variance, or standard deviation in the radius that is determined in units of distance. Under a third technique, an indicator comprises an error estimate, variance, difference or vector difference in the radius with respect to a generally circular perimeter of the field. Under a fourth technique, the indicator comprises a display bar (55 in FIG. 6), such as a percentage-of-completion bar, a shaded bar, a light bar, or a graphical representation of a completion bar, shaded bar, or light bar on the user interface 22 (e.g., display) of the vehicle. Under a fifth technique, the shaded portion (54 in FIG. 6) or completion portion of the display bar representation 55 is increased to the extent that the error estimate, variance, or standard deviation improves or converges on a solution; hence, aligns a spiral path plan that can be produced by the spiral path planning module 30 to terminate at or close to the true center point of the generally circular perimeter or circular region. Under a sixth technique, if the determined error estimate is less than the threshold error, the operator can cease or discontinue manually steering the vehicle along the curved path, or the data processing system 14, the quality evaluation module 28, or estimator 31 can authorize the transition of the vehicle into the automated guidance mode in which the guidance module 26 or data processing system 15 steers and controls the path of the vehicle, or controls its velocity or acceleration.

Figure 3:
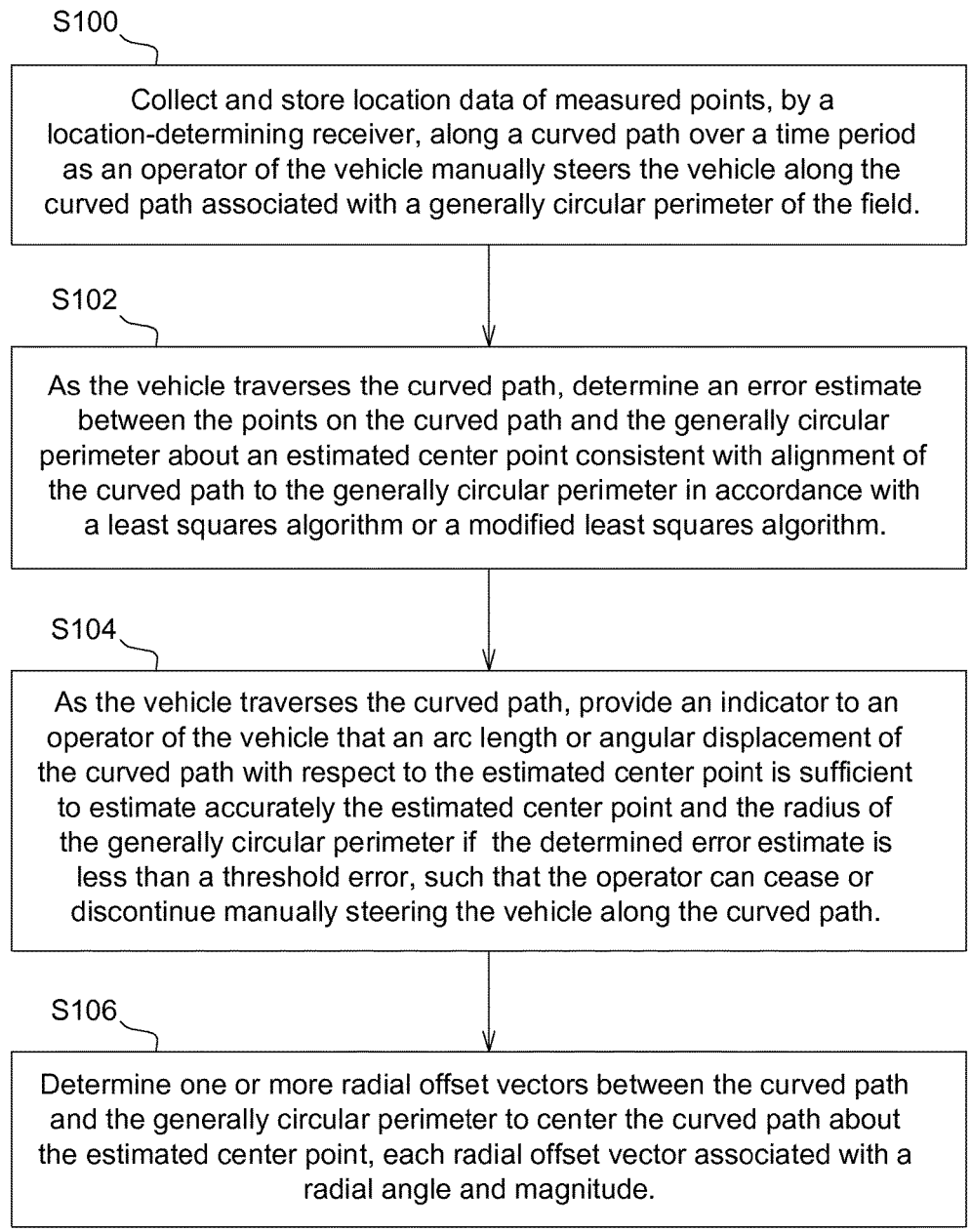
FIG. 3 is a block diagram of another embodiment for a method for guiding an off-road vehicle along a curved path.

The method of FIG. 3 is similar to the method of FIG. 2, except the method of FIG. 3 further comprises step S106. Like reference numbers in FIG. 2 and FIG. 3 indicate like steps or procedures.

In step S106, the estimator 31 or data processor 18 determines one or more radial offset vectors (e.g., differences) between the curved path and the generally circular perimeter to center or align the curved path about the estimated center point, where each radial vector is associated with a radial angle and magnitude. For example, the estimator 31 determines the radial offset vectors to center or align the generally circular perimeter about the true center point; hence, aligns a spiral path plan that can be produced by the spiral path planning module 30 to terminate at or close to the true center point of the generally circular perimeter or circular region.

Figure 4:
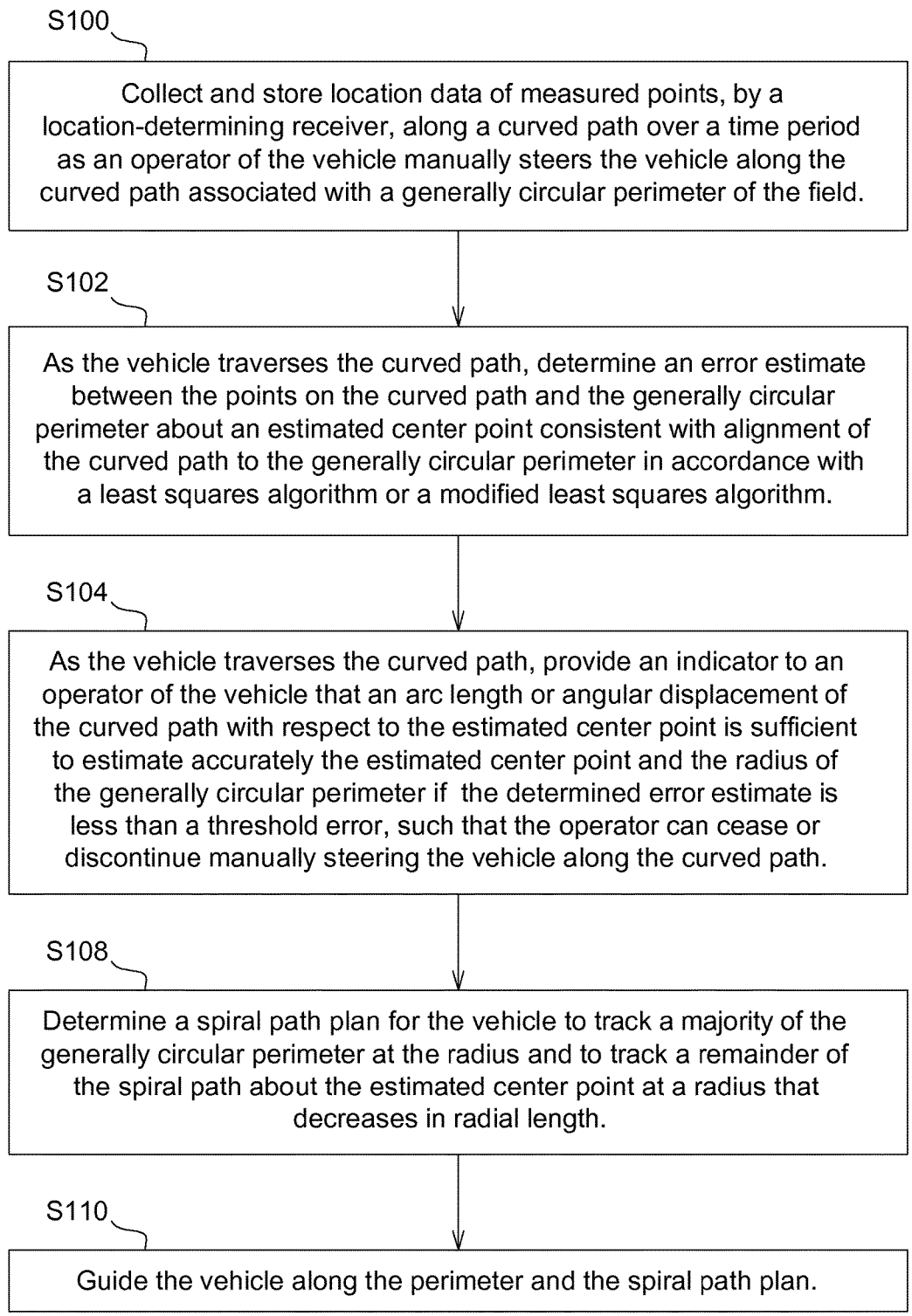
FIG. 4 is a block diagram of yet another embodiment for a method for guiding an off-road vehicle along a curved path.

The method of FIG. 4 is similar to the method of FIG. 2, except the method of FIG. 4 further comprises step S108 and S110. Like reference numbers in FIG. 2 and FIG. 4 indicate like steps or procedures.

In step S108, a data processor 18 or spiral path planning module 30 determines a spiral path plan for the vehicle to track a majority of the generally circular perimeter at the radius (e.g., initial radius) and to track a remainder of the spiral path about the estimated center point at a radius (e.g., variable radius) that decreases in radial length as the vehicle progresses toward the center point.

In step S110, in the automated guidance mode the data processor 18 or the guidance module 26 guides (e.g., steers) the vehicle along the perimeter (e.g., at least part of the generally circular perimeter) and the spiral path plan. In one embodiment, the guidance module 26 may guide or steer the vehicle consistent with the path plan from the spiral path planning module 30. The spiral path planning module 30 can provide a spiral path plan that is aligned with the estimated center point (e.g., true center point) and the generally circular perimeter or perimeter data 32. The spiral path planning module 30 can provide a spiral path plan with a starting point from the generally circular perimeter or from the estimated center point, for execution by the guidance module 26. For example, the data processor 18 or the guidance module 26 controls one or more of the following controllers to automatically guide the vehicle along the perimeter, the spiral path plan, or both: steering controller 40, propulsion controller 44, and braking controller 48. In one embodiment, the automatic transition into or operator selection of automated guidance mode must be authorized by the guidance mode controller 33.

Figure 5:
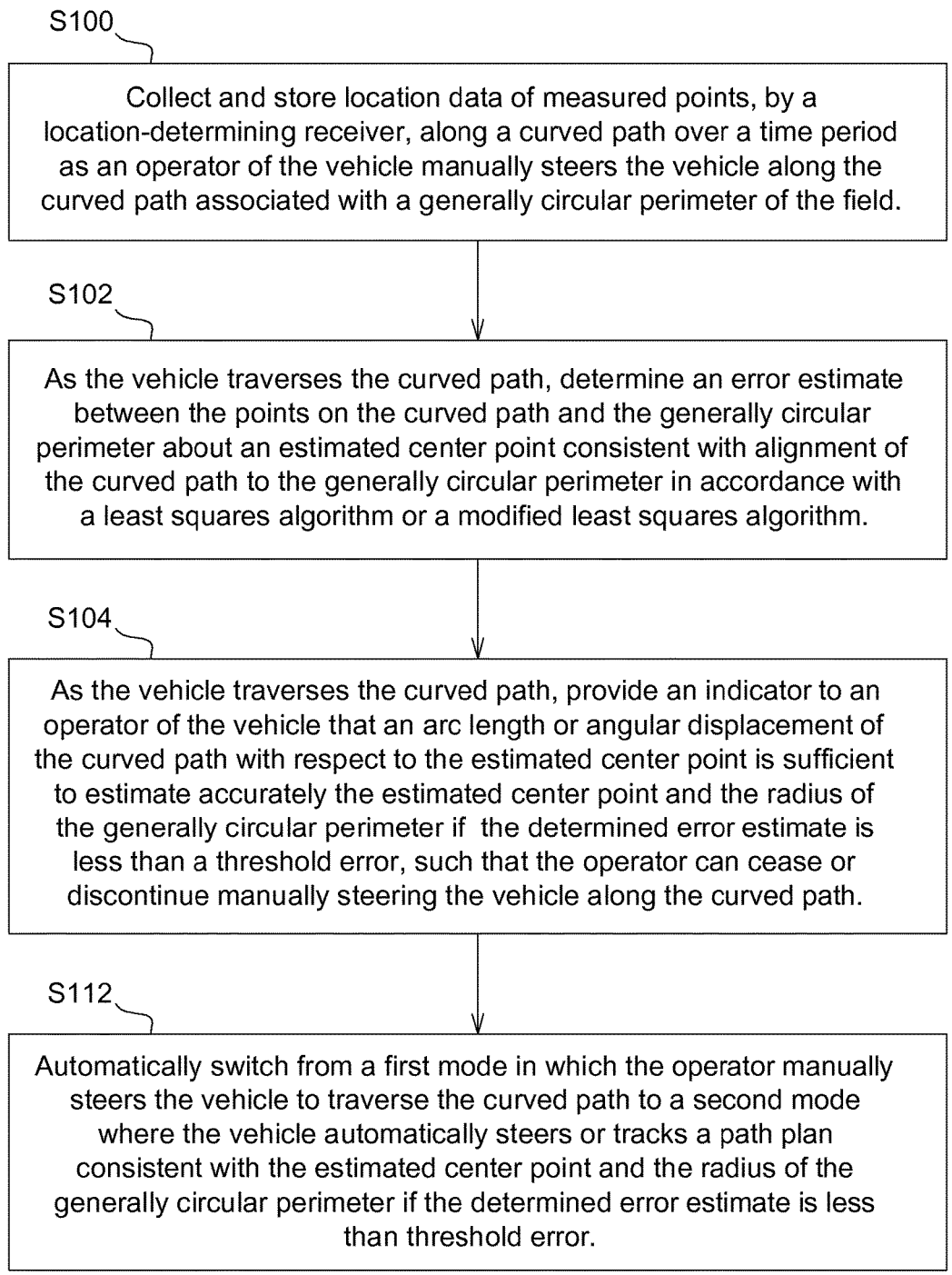
FIG. 5 is a block diagram of still another embodiment for a method for guiding an off-road vehicle along a curved path.

The method of FIG. 5 is similar to the method of FIG. 2, except the method of FIG. 5 further comprises step S112. Like reference numbers in FIG. 2 and FIG. 5 indicate like steps or procedures.

In step S112, the data processor 18 or the mode controller 33 automatically switches from a first mode (e.g., manual guidance mode) in which the operator manually steers the vehicle to traverse the curved path to a second mode (e.g., automated guidance mode) where the vehicle automatically steers or tracks a path plan consistent with the estimated center point and the radius of the generally circular perimeter if the determined error estimate is less than threshold error. As indicated previously, the path plan can be executed outwardly from the center point or inwardly from the generally circular perimeter of the field.

Step S112 may be executed in accordance with various techniques, which may be applied separately or cumulatively. Under a first technique, the data processor 18 provides an alert message or symbol to the operator on the user interface 22 to indicate a transition between the first mode (e.g., manual guidance mode) and the second mode (e.g., automated guidance mode). Under a second technique, the error estimate comprises a variance or standard deviation of the radius (e.g., to indicate circle quality). Under a third technique, the error estimate is based on variance or standard deviation in a set of estimated center points. Further, each estimated center point in the set can correspond to a corresponding set of one or more measured points (e.g., location data) along the curved path, or arcs derived from the measured points. Under a fourth technique, the error estimate is determined in accordance with the following equation:

$$C=\sqrt{x^2+y^2},$$

where C is the estimated center point, x is the X-axis coordinate for the measured point (on or near the generally circular perimeter) via the location-determining receiver 10, y is the Y-axis coordinate for the measured point (on or near the generally circular perimeter) via the location-determining receiver 10. Under a fifth technique, the error estimate comprises a standard deviation of a set of estimated center points, where each estimated center point in the set corresponds to a corresponding set of one or more measured points (or an arc) along the curved path.

Figure 6:
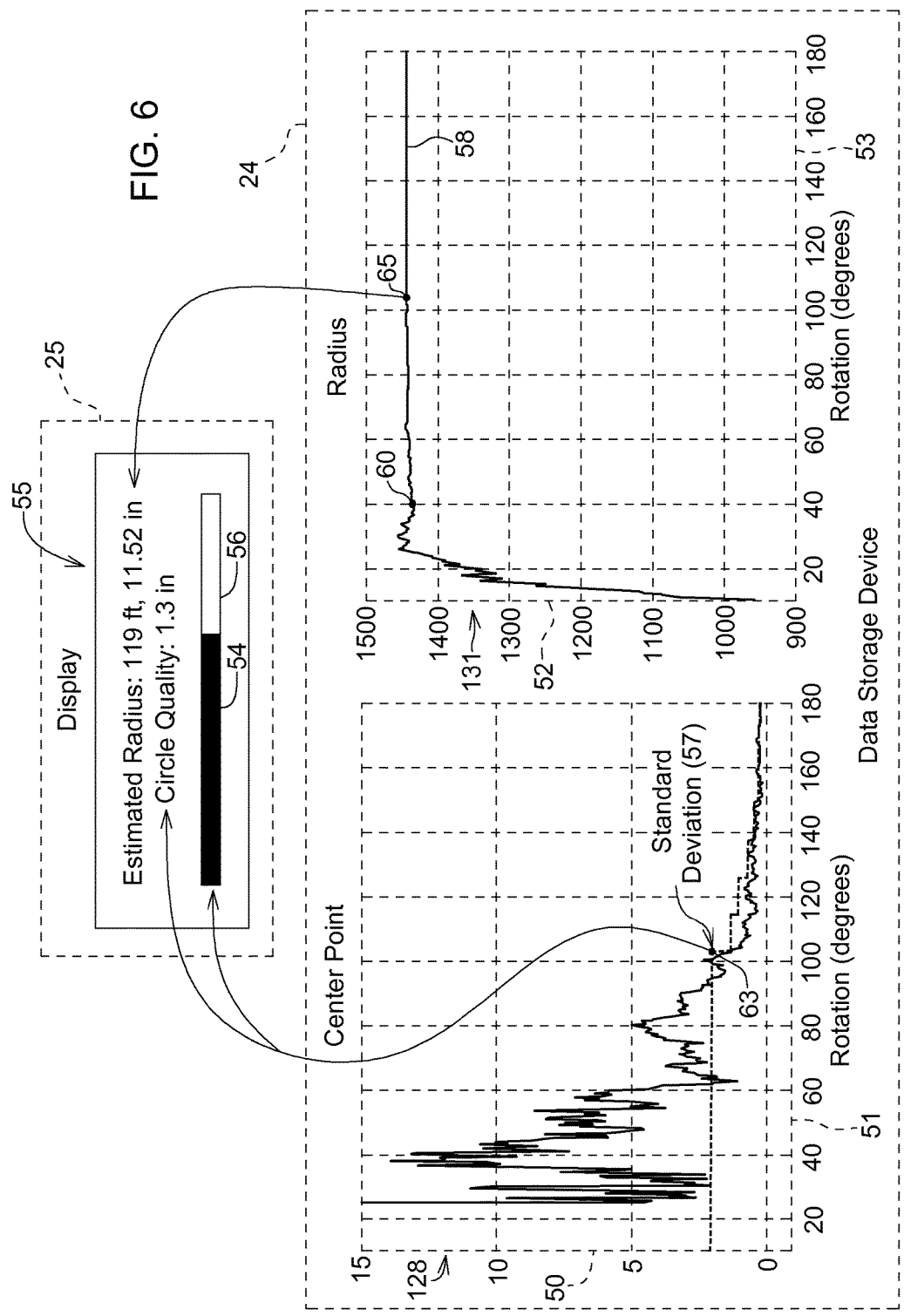
FIG. 6 is a diagram that provides: illustrative examples of charts in which the data processor converges on an accurate center point estimate and accurate radius estimate of the perimeter for guidance of the vehicle, and a display bar representation of the accuracy of the estimates for display on the user interface.

FIG. 6 provides an illustrative examples of a first chart 128 in which the data processor 18 converges on an accurate center point estimate as the operator of the vehicle manually steers the vehicle along an increasing arc length or arc angle about the center point of the field or work area. The vertical axis 50 of the first chart 128 discloses displacement, variance or deviation of the estimate of the center point, where the deviation is expressed in suitable units of distance measurements (e.g., inches or centimeters). The horizontal axis 51 of the first chart 128 discloses the arc length, arc angle of rotation, or angular displacement (70 in FIG. 8) that the operator has manually driven the vehicle about the center point of the field or work area. As the arc length or arc angle of rotation increases, the deviation, variance and standard deviation 57 of the estimates of the center point decrease. As illustrated in the first chart 128, the standard deviation 57 is shown as a decreasing stair-case-shaped function with increasing rotation or angular displacement (70) of the vehicle around the center point along the curved path of the generally circular circumference, although in other embodiments the standard deviation may be represented by a linear or curved function (e.g., quadratic function).

FIG. 6 further provides an illustrative example of a second chart 131 in which the data processor 18 converges on an accurate estimate of the radius or radial length between the center point of the field and a circular perimeter or arc that is manually steered by an operator of the vehicle. The vertical axis 52 of the second chart 131 discloses the radial distance or radius between the center point and the circular perimeter of the field, where the radial distance is expressed in suitable distance units of measurement (e.g., feet, inches or meters). The horizontal axis 53 of the second chart 131 discloses the arc length of rotation or angular displacement (70 in FIG. 8) that the operator has manually driven the vehicle along the circular perimeter and about the center point of the field or work area. As the arc length or arc angle increases, the deviation, variance and standard deviation of the estimates of the radial length or radius decrease.

In one embodiment, the first chart 128 and the second chart 131 are illustrative examples of data that is stored in the data storage device 24, although the data could also be stored as a file, a look-up table, a chart, a graph, a database, data records, or one or more equations (e.g., quadratic equations or piecewise equations).

In one embodiment, a display bar representation 55 provides an indicator of the accuracy of the estimates of center point position and radial length or radius for display on the user interface 22 at any given angular rotation (51, 53) about the center point and along the curved path of the vehicle. For example, the higher the reliability or accuracy of the estimate, the greater the size of the filled-in percentage 54 of the display bar 55 or shaded portion of the display bar 55. Conversely, the higher the reliability or accuracy of the estimate, the lesser the size of the unshaded portion 56 of the display bar 55. As illustrated in FIG. 6, the display bar representation 55 represents a quality indicator (e.g., the circle quality or alignment of the observed location data to the modeled circle) as the standard deviation 57 at approximately 105 degrees of rotation at reference point 63 in the first chart 128; the display bar representation 55 represents the estimated radius at approximately 105 degrees of rotation at reference point 65 in the second chart 131. Although the radius is fairly stable in the second chart 131 above approximately forty (40) degrees of rotation at reference point 60, in practice the degrees of rotation, or angular displacement 70 to achieve a generally stable radius may vary with sundry factors, such as the quality of the visual marks tracking a circular path for the operator to manually track, soil conditions (e.g., moisture), tire conditions (e.g., tread wear), operator skill, operator vision (e.g., normal or deficient vision), among other possible factors.

The data processor 18 may present the display bar representation 55 via a user interface 22 (e.g., display 25) for display to the operator such that the operator can use the display bar 55 as a guide for: (1) operator's discontinuing manual steering of the vehicle along a generally circular circumference or arc (e.g., in the manual guidance mode), or (2) operator's awareness of when the vehicle data processing system 14 may automatically transition from the first mode (e.g., manual guidance mode or the manual operator-steered mode) to second mode (e.g., automated guidance mode or automatic guidance system-steered mode), or both. In one example, the operator may discontinue manually steering a curved path about the generally circular perimeter after establishing, with sufficient reliability or quality, the center point and boundary for the field or work area. In another example, the operator may discontinue manually steering the curved pay to manually activate the second mode (e.g., automatic guidance mode). In still another example, the data processor 18 or the mode controller 33 automatically switches from a first mode in which the operator manually steers the vehicle to traverse the curved path to a second mode where the vehicle automatically steers or tracks a path plan consistent with the estimated center point and the radius of the generally circular perimeter if the determined error estimate is less than threshold error, or when the shaded portion 54 of the display bar 55 is shaded more than a threshold level that corresponds to threshold error.

In an alternate embodiment, the display bar 55 may change its displayed color on the user interface 22 or display 25 when the determined error estimate is less than a threshold.

Figure 7:
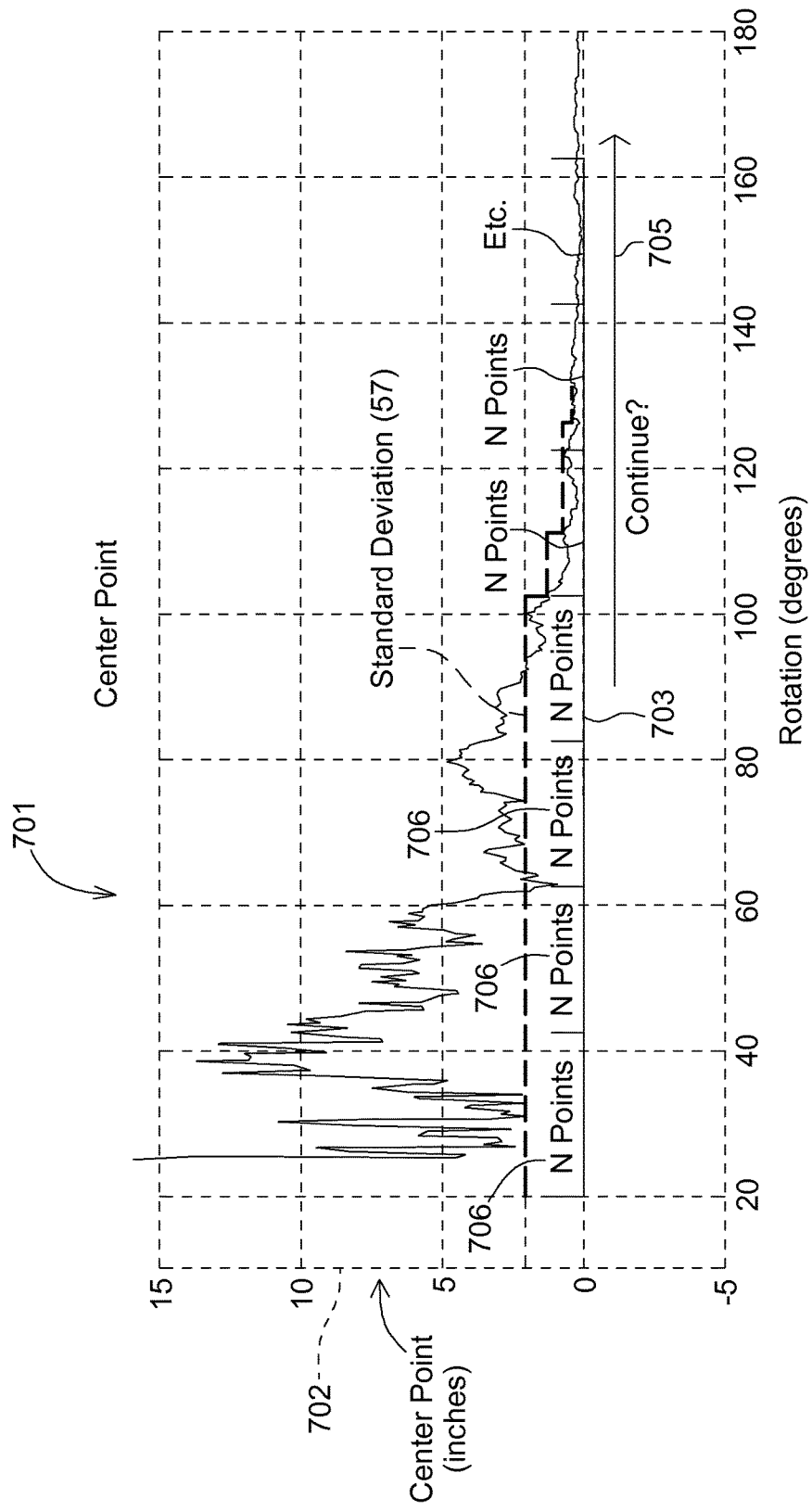
FIG. 7 is a chart that shows an illustrative example of variance in the estimate of the center point versus the degrees of the an arc manually driven or traversed by an operator of the vehicle.

FIG. 7 is a chart 701 that shows an illustrative example of variance in the estimate of the center point versus the degrees of the an arc of rotation (e.g., angular displacement 70) manually driven or traversed by an operator of the vehicle. The vertical axis 702 provides the variance of the center point, in measurement units of distance, such as inches. The horizontal axis 703 provides the degrees of rotation that the operator of the vehicle has manually driven the vehicle along an arc or curved path associated with a boundary or outer perimeter of a field or work area. As the vehicle traverses over an arc or curved path of a corresponding arc length or angular arc, the location-determining receiver 10 or data processing system 14 collects a series of location points (e.g. N points 706 per corresponding angular range) that correspond to the location of the vehicle over time. The standard deviation 57 of the estimated center point decreases as the operator manually drives more of the curved path, or traverses a greater angular arc along the curved path. As represented by arrow 705, the operator can determine whether or not to continue manually driving the curved path along the generally circular circumference at any particular rotation associated with a sufficiently low error estimate or sufficiently low standard deviation 57. Similarly, the data processing system 14, estimator 31, quality evaluation module 28, or mode controller 33 can determine whether or not to continue manually driving the curved path along the generally circular circumference at any particular rotation associated with a sufficiently low error estimate or sufficiently low standard deviation 57, or whether to enable the automated guidance mode.

Figure 8:
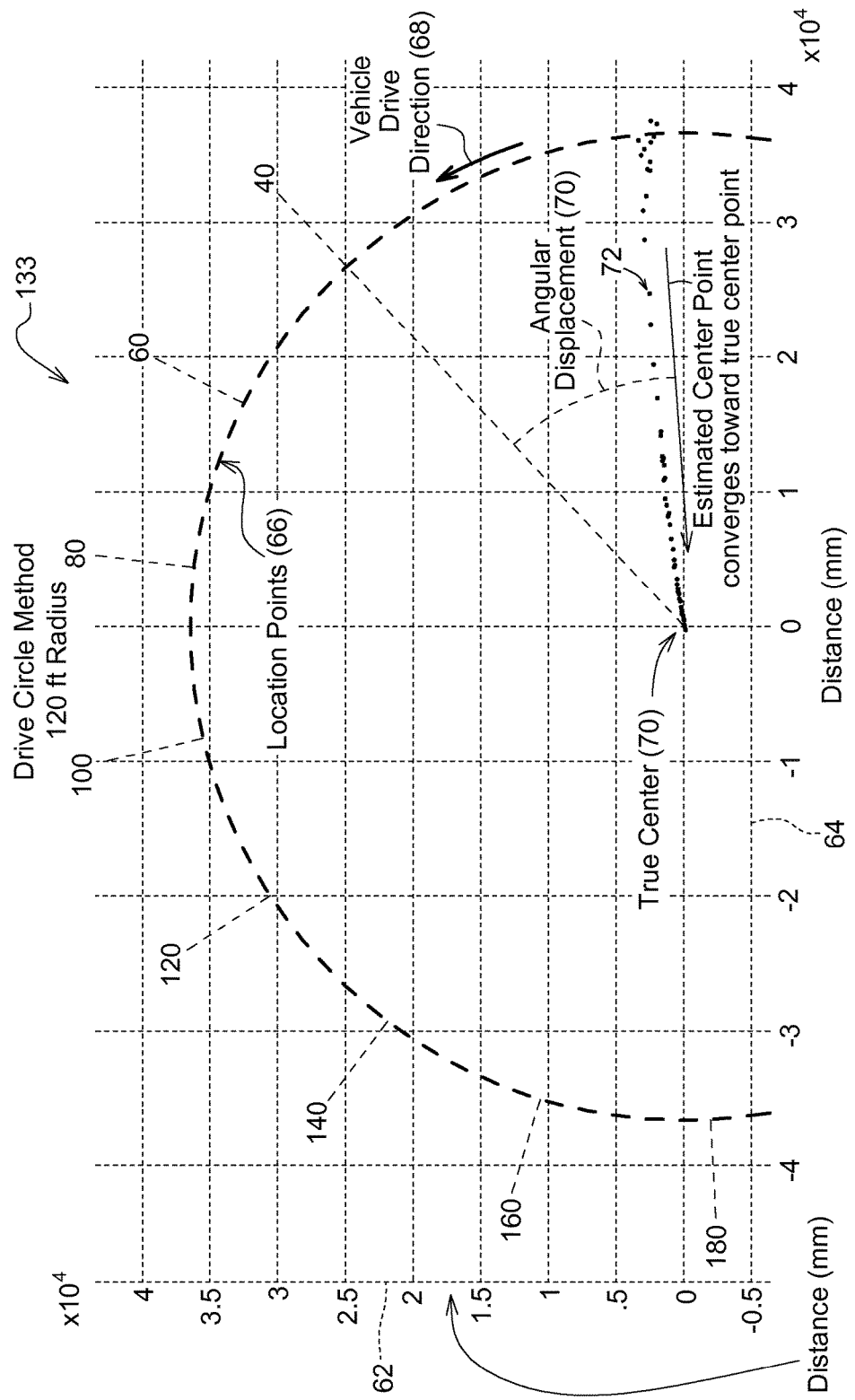
FIG. 8 is a chart that shows another illustrative example of variance in the estimate of the center point versus the degrees of the an arc manually driven or traversed by an operator of the vehicle.

FIG. 8 is a chart 133 that shows another illustrative example of variance in the estimate of the center point versus the degrees of the an arc (or angular displacement 70) manually driven or traversed by an operator of the vehicle. The vertical axis 62 and horizontal axis 64 each provide the variance between the estimated center point 72 and the true center point 70, in measurement units of distance, such as millimeters. As the vehicle traverses over an arc or curved path of a corresponding arc length, angular arc, or angular displacement 70 in the vehicle drive direction 68, the location-determining receiver 10 or data processing system 14 collects a series of location points 66 (e.g., two dimensional or three dimensional spatial coordinates) that correspond to the location of the vehicle over time and the estimated center point 72 converges toward the true center point 70. Alternately, the location-determining receiver 10 or data processing system 14 may define arcs between collected location points to allow extrapolation or estimation of the observed curved path of the vehicle.

The method and system of this disclosure is well-suited for allowing an operator to drive his off-road vehicle over an angular displacement that is adequate to reliably establish an accurate center point, radius, or both and a resultant spiral path plan for steering and automated guidance control of the vehicle consistent with the accurate center point and radius.

Having described the preferred embodiment, it will become apparent that various modifications can be made without departing from the scope of the disclosure as defined in the accompanying claims.

The following is claimed:

1. A method for guiding an off-road vehicle, the method comprising:
    collecting and storing location data of measured points, by a location-determining receiver, along a curved path over a time period as an operator of the vehicle manually steers the vehicle along the curved path associated with a generally circular perimeter of a field;
    in real-time as the vehicle traverses the curved path, determining, by an electronic data processor, an error estimate between a plurality of points on the curved path and the generally circular perimeter associated with an estimated center point consistent with alignment of the curved path to the generally circular perimeter in accordance with a least squares algorithm or a modified least squares algorithm; and
    in real-time as the vehicle traverses the curved path, providing an indicator, via a user interface, to an operator of the vehicle that an arc length or angular displacement of the curved path with respect to the estimated center point is sufficient to estimate accurately the estimated center point and the radius of the generally circular perimeter if the determined error estimate is less than a threshold error, such that the operator can cease or discontinue manually steering the vehicle along the curved path to transition to automatic steering of a spiral path aligned with the generally circular perimeter.

2. The method according to claim 1 wherein the operator manually steers the vehicle over the curved path over the arc length that is greater than approximately forty degrees with respect to the estimated center point.

3. The method according to claim 1 further comprising:
    determining one or more radial offset vectors between the curved path and the generally circular perimeter to center the curved path about the estimated center point, each radial offset vector associated with a radial angle and magnitude.

4. The method according to claim 1 further comprising:
    determining the spiral path plan for the vehicle to track a majority of the generally circular perimeter at the radius and to track a remainder of the spiral path about the estimated center point at a radius that decreases in radial length.

5. The method according to claim 4 further comprising:
    guiding the vehicle along the perimeter and the spiral path plan.

6. The method according to claim 1 wherein the error estimate is determined in units of distance.

7. The method according to claim 1 wherein the indicator comprises a light bar or a graphical representation of a light bar on the user interface of the vehicle.

8. The method according to claim 1 wherein the vehicle automatically switches from a first mode in which the operator manually steers the vehicle to traverse the curved path to a second mode where the vehicle automatically steers or tracks a path plan consistent with the estimated center point and the radius of the generally circular perimeter if the determined error estimate is less than threshold error.

9. The method according to claim 8 further comprising:
    providing an alert message or symbol to the operator on the user interface to indicate a transition between the first mode and the second mode.

10. The method according to claim 1 wherein the error estimate comprises a standard deviation of the radius to indicate circle quality.

11. The method according to claim 1 wherein the error estimate is based on estimating a set of estimated center points, where each estimated center point in the set corresponds to a corresponding one of the measured points along the curved path.

12. The method according to claim 11 wherein the error estimate is determined in accordance with the following equation:

$$C = \sqrt{x^2 + y^2},$$

where C is the estimated center point, x is the X-axis coordinate for the measured point via the location-determining receiver, y is the Y-axis coordinate for the measured point via the location-determining receiver.

13. The method according to claim 1 wherein the error estimate comprises a standard deviation of a set of estimated center points, where each estimated center point in the set corresponds to a corresponding one of the measured points along the curved path.

* * * * *